United States Patent [19]

Matsumoto et al.

[11] Patent Number: 5,087,967
[45] Date of Patent: Feb. 11, 1992

[54] COLOR IMAGE PICKUP DEVICE HAVING A LEVEL CORRECTING CIRCUIT FOR CORRECTING LEVEL VARIATIONS IN COLOR IMAGE SIGNALS

[75] Inventors: Hiroaki Matsumoto, Chiba; Tokuya Fukuda, Tokyo, both of Japan

[73] Assignee: Sony Corporation, Tokyo, Japan

[21] Appl. No.: 419,276

[22] Filed: Oct. 10, 1989

[30] Foreign Application Priority Data

Oct. 13, 1988 [JP] Japan ................. 63-258293

[51] Int. Cl.$^5$ ............................................. H04N 9/77
[52] U.S. Cl. ........................................ 358/41; 358/39
[58] Field of Search .................... 358/41, 44, 39, 37

[56] References Cited
U.S. PATENT DOCUMENTS 4,176,373 11/1979 Dillon et al. ................. 358/41
4,697,208 9/1987 Eino ............................ 358/44

FOREIGN PATENT DOCUMENTS 0164255 11/1985 European Pat. Off. .
0291354 11/1988 European Pat. Off. .

Primary Examiner—James J. Groody
Assistant Examiner—Kim Yen Vu
Attorney, Agent, or Firm—Alvin Sinderbrand; William S. Frommer

[57] ABSTRACT

Apparatus for processing a color video signal produced by an imager. A low-pass filter supplied with the color video signal from the imager generates a luminance signal to which is added an outline component produced by a level correcting circuit that receives the color video imager signal and passes a level-corrected imager signal through a bandpass filter which extracts therefrom the outline component.

10 Claims, 6 Drawing Sheets

FIG. 6A (S1)
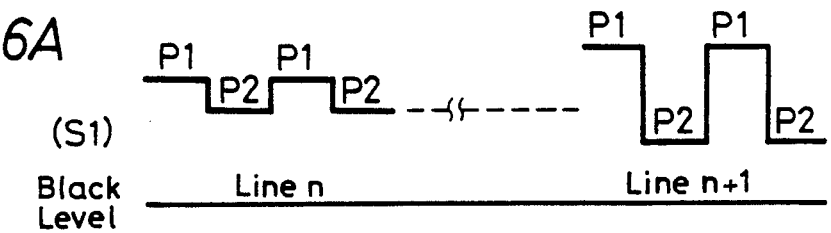
FIG. 6B (S2)
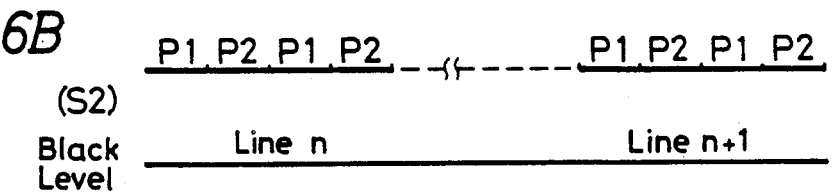
FIG. 6C (S3)
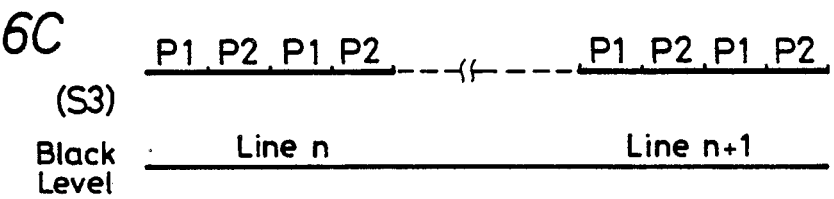
FIG. 7A (S1')
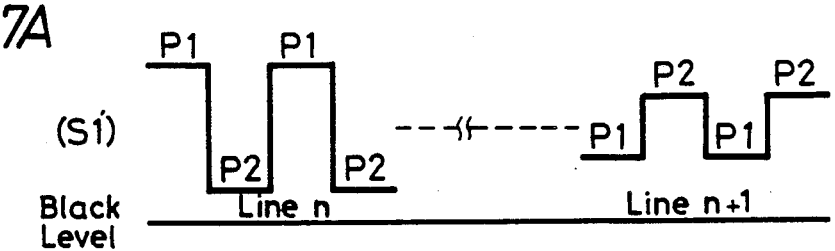
FIG. 7B (S2')
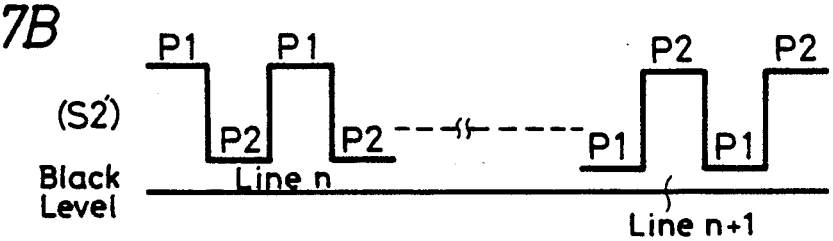
FIG. 7C (S3)
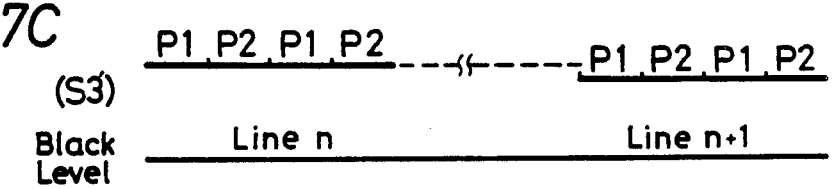

COLOR IMAGE PICKUP DEVICE HAVING A LEVEL CORRECTING CIRCUIT FOR CORRECTING LEVEL VARIATIONS IN COLOR IMAGE SIGNALS

BACKGROUND OF THE INVENTION

1. Field of the Invention

The present invention relates generally to apparatus for processing a color video signal and more particularly to such apparatus which minimizes sideband interference and line-to-line level differences from a single tube-type color video camera having complementary color filters of the so-called checkered type.

2. Description of the Prior Art

In a black and white (monochromatic) video camera utilizing a charge-coupled device (CCD), a video signal of frequency fi is sampled at a sampling frequency fs. However, this results in a sideband component (known as aliasing noise) at the frequencies fs±fi as shown in the frequency spectrum representation of FIG. 1. In a color video camera, however, the requisite color filter has different spectral sensitivities for achromatic color so that sideband components (or aliasing noise) are produced at the frequencies fs/2±fi as shown in FIG. 2. Such fs/2±fi sideband components are produced when the color filter is of the type having rows of color filter elements formed of two filter pixel units which alternate repeatedly in the horizontal direction.

This sideband component produced when an achromatic color scene is imaged, produces zero beat noise with the input frequency fi. Assuming a 510 H imager (that is, an imager having 510 filter pixels per line) with a sampling frequency fs=9.6 MHz, FIG. 3 represents that zero beat frequencies of 3.6 MHz, 3.2 MHz and 2.4 MHz are produced at the higher harmonics of the input frequency fi having fundamental frequencies 1.2 MHz, 1.6 MHz and 2.4 MHz, respectively. This zero beat noise gives rise to distortion in the picture produced from the video camera.

In order to remove the side band component in the color video signal produced when achromatic color is imaged, color video signaling processing has been proposed. While this apparatus operates satisfactorily for achromatic color signals, when that same apparatus is used with a chromatic color video signal, line-to-line level variations are induced in the luminance signal, resulting in interference in the picture displayed therefrom.

OBJECTS AND SUMMARY OF THE INVENTION

Therefore, it is an object of the present invention to provide improved apparatus for processing a color video signal to eliminate, or at least substantially minimize, sideband components in an achromatic color signal and line-to-line level variations in a chromatic color signal.

It is another object of the present invention to provide such apparatus that is particularly advantageous for use with a color video camera having a checkerboard-type color filter.

In accordance with this invention, color video signal processing apparatus comprises an imager for generating a color video imager signal; a low-pass filter supplied with the imager signal for generating a luminance signal; a level corrector supplied with the imager signal for providing a level-corrected signal; a bandpass filter for extracting an outline component from the level-corrected signal; and an adder for adding the outline component to the luminance signal generated by the low-pass filter.

These and other objects, features and advantages of the present invention will be apparent from the following detailed description, given by way of example and not intended to limit this invention solely thereto, when read in conjunction with the accompanying drawings.

BRIEF DESCRIPTION OF THE DRAWINGS

FIGS. 6A to 6C are schematic waveform diagrams which are useful in explaining the operation of the apparatus of FIG. 4;

FIGS. 7A to 7C are schematic waveform diagrams which are useful in explaining the operation of the apparatus of FIG. 4;

DETAILED DESCRIPTION OF A PREFERRED EMBODIMENT

Figure 4:
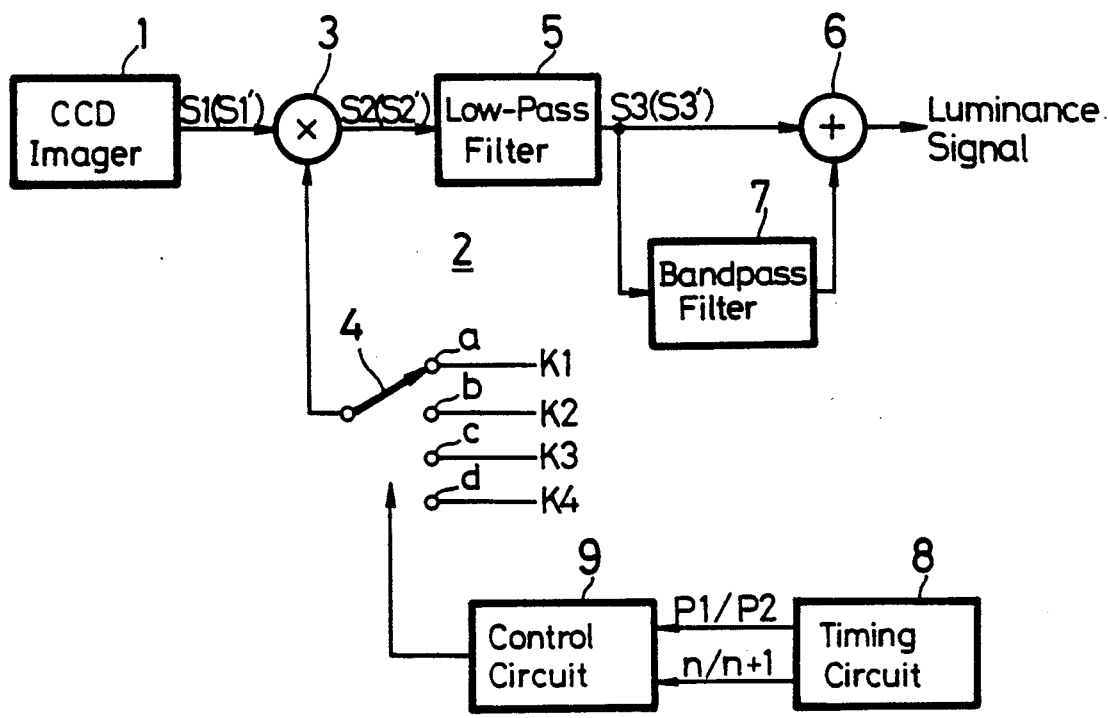
FIG. 4 is a block diagram of previously proposed apparatus for processing a color video signal to eliminate sideband components from an imager achromatic color signal.

Before describing the present invention, reference is made to FIG. 4. There is shown a CCD imager 1 which supplies an output signal S1 to a level balance circuit 2 comprised of a multiplier 3 and a switch 4 which selectively supplies one of several predetermined coefficients K1 to K4 to the multiplier. An imager signal S1 from CCD imager 1 is supplied to multiplier 3 which is adapted to multiply the level of the imager signal with the coefficient K1 to K4 selected by switch 4.

An output signal S2 from multiplier 3 is filtered by a low-pass filter 5 which produces a luminance signal S3. This luminance signal S3 is coupled directly to an adder 6, and also is supplied to the adder through a bandpass filter 7 which functions as an aperture circuit. The bandpass filter 7 extracts an outline component from the luminance signal S3, which is added in adder 6 to the luminance signal produced by low-pass filter 5. Consequently, adder 6 generates a luminance signal whose outline is emphasized.

A timing circuit 8 generates timing signals for the scanning of filter pixels P1, P2 of imager 1 (as will be described) and timing signals for the scanning of horizontal lines n and n+1 of filter pixels (as will also be described). The filter pixels constitute a color filter for imager 1, used as part of a so-called complementary color checkered coding system shown in FIG. 5. The timing signals of timing circuit 8 are supplied to a control circuit 9 which, in turn, supplies switching signals to switch 4 to select a respective multiplier coefficient K1 to K4.

Figure 5:
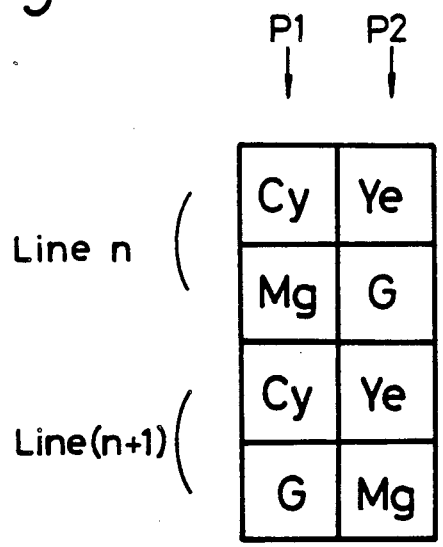
FIG. 5 is a schematic diagram of a complementary color filter that may be used with the apparatus of FIG. 4.

The color filter used with CCD imager 1 carries out complementary color checkered coding and, as one example, may be of the type shown in FIG. 5. This color filter is comprised of a fundamental arrangement formed of two columns and four rows of pixel filter units. For example, the first and third rows are formed of repetitive, alternate cyan (Cy) and yellow (Ye) elements, or pixel units, and the second and fourth rows are formed of repetitive alternate magenta (Mg) and green (G) elements. The sum of the cyan and magenta elements constitutes a first pixel P1 of the n-the line of filter elements, and the sum of the yellow and green elements constitutes a second pixel P2 of the n-th line. The n-th line is formed by the repetition of alternate pixels P1 and P2.

The sum of the cyan and green elements constitutes a first pixel P1 of the (n+1)-th line of filter elements, and the sum of the yellow and magenta elements constitutes a second pixel P2 of the (n+1)-th line. The (n+1)-th line is formed by the repetition of alternate pixels. Japanese Laid-Open Patent Gazette No. 62-277879 describes other examples of complementary color checkered coding.

When timing circuit 8 generates a timing signal for the first pixel P1 of the n-th line, control circuit 9 supplies a corresponding switching signal to switch 4 to supply the coefficient K1 to multiplier 3 for multiplying the imager signal therewith. When the timing circuit generates a timing signal for the second pixel P2 of the n-th line, the control circuit supplies a switching signal to switch 4 to supply the coefficient K2 to the multiplier. Similarly, when the timing circuit generates a timing signal for the first pixel P1 of the (n+1)-th line, the imager signal is multiplied by the coefficient K3; and when the timing circuit generates a timing signal for the second pixel P2 of the (n+1)-th line, the imager signal is multiplied by the coefficient K4.

Figure 1:
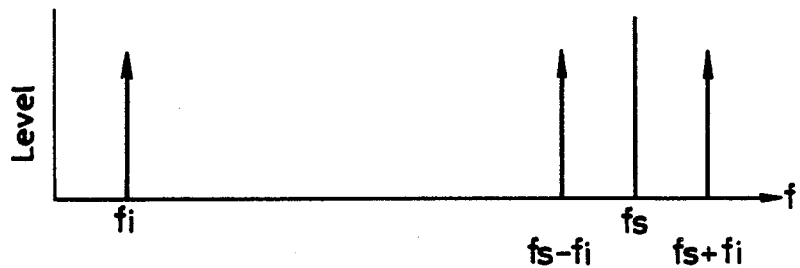
FIG. 1 is a representation of the frequency spectrum obtained from a black and white imager.
Figure 2:
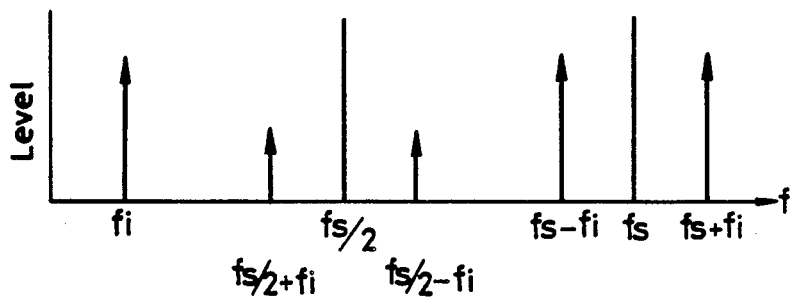
FIG. 2 is a representation of the frequency spectrum obtained from a color imager.
Figure 3:
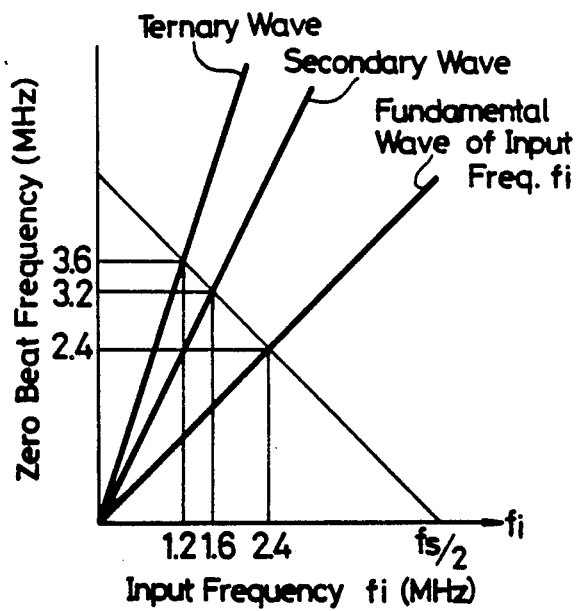
FIG. 3 represents how zero beat noise is produced due to sideband components.

The operation of the color video signal processing apparatus on an achromatic color scene will be explained with reference to FIG. 6. When an achromatic color scene is scanned, CCD imager 1 generates an output imager signal S1 having two different levels corresponding to the first and second pixels P1 and P2 of the n-th line and an additional two different levels corresponding to the first and second pixels P1 and P2 of the (n+1)-th line, as shown in FIG. 6A. Multiplier 3 of level balance circuit 2 multiplies the signal S1 with respective ones of coefficients K1 to K4 to generate signal S2 in which the above-noted imager signal levels are adjusted to be substantially the same throughout lines n and (n+1), as shown in FIG. 6B. In this level-corrected state, the sideband components shown in FIG. 2 are not present. The luminance signal derived from an achromatic color signal can be level-balanced with no difficulties, resulting in the output signal S3 from low-pass filter 5, as shown in FIG. 6C.

Since the coefficients K1 to K4 of level balance circuit 2 are determined so as to level balance an achromatic color signal, when the imager signal S1 from CCD imager 1 is a chromatic color signal and is multiplied by the coefficients K1 to K4, a level difference occurs from one line to the next in the luminance signal, producing a horizontal stripe effect in the picture reproduced therefrom, as now will be explained with reference to FIGS. 7A to 7C. When a chromatic color scene is scanned, CCD imager 1 generates the output signal (imager signal) S1 shown in FIG. 7A, having two different levels corresponding to the first and second pixels P1, P2 of the n-th line and an additional two different levels corresponding to the pixels P1, P2 of the (n+1)-th line. Multiplier 3 of level balance circuit multiplies the signal S1' with respective ones of coefficients K1 to K4 which, it is recognized, are the same as used to multiply the achromatic color signal. The multiplier generates output signal S2' in which the levels of the pixels are different within a given line and from line to line, as shown in FIG. 7B.

When signal S2' is filtered by low-pass filter 5, an output signal S3' is generated in which the pixel-to-pixel levels are averaged to a common level within a line, but the averaged pixel levels in one line differ from the averaged pixel levels in the next line, as shown in FIG. 7C. This results in horizontal stripes in the video picture.

Figure 8:
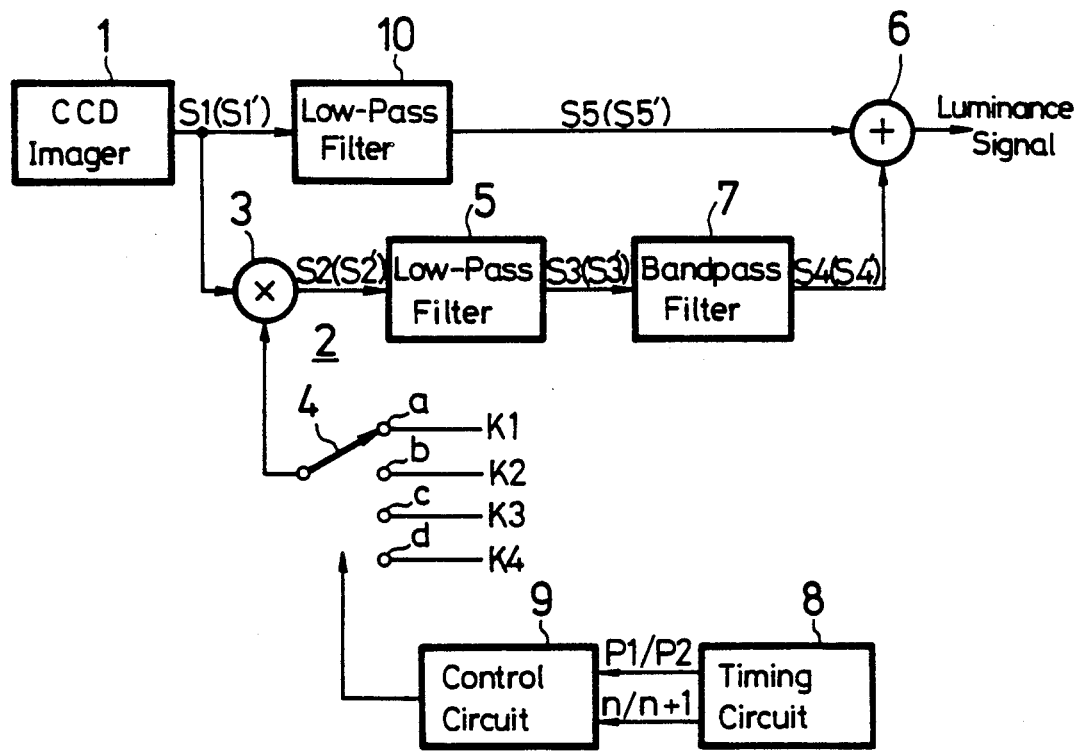
FIG. 8 is a block diagram of an embodiment of the present invention.

Turning now to FIG. 8, one embodiment of the present invention will be described. Those parts in FIG. 8 which are the same as those of FIG. 4 are identified with the same reference numerals. As shown, the imager signal from CCD imager 1 is supplied to adder 6 by way of level correcting circuit 2 and bandpass filter 7, as in FIG. 4, and also through a low-pass filter 10. It is seen that the imager signal which passes through low-pass filter 10 is not level-processed, but is added to the level-balanced aperture signal from bandpass filter 7. This prevents line-to-line level differences from being produced when a chromatic color signal is produced by the imager. As was true for the FIG. 4 apparatus, the FIG. 8 embodiment eliminates the aforementioned undesired sideband component when an achromatic color signal is produced.

Figure 9A:
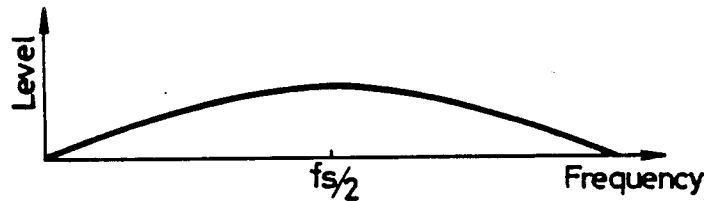
FIGS. 9A to 9C are schematic waveform diagrams which are useful in explaining the operation of the bandpass filter used in the present invention.
Figure 9B:
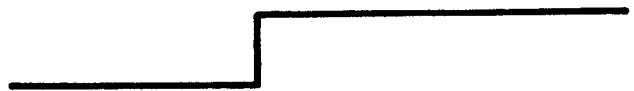
Figure 9C:
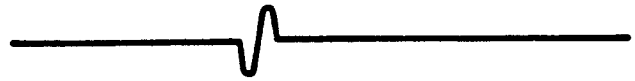

Bandpass filter 7 has the frequency characteristic shown in FIG. 9A, wherein its pass band center frequency is, for example, fs/2 (4.8 MHz in the case of a 510 H imager). Thus, the bandpass filter does not pass a low frequency component such as on the order of about half the usual horizontal synchronizing frequency. When supplied with a signal derived from several pixel units and having a high band component of the type represented by the waveform shown in FIG. 9B, bandpass filter 7 extracts an outline component having the waveform shown in FIG. 9C.

Figure 10A:
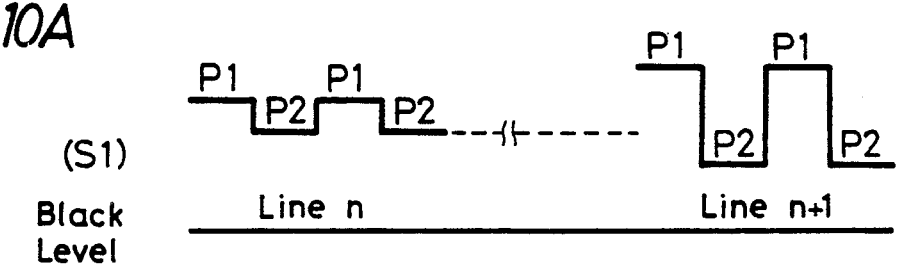
FIGS. 10A to 10E are schematic waveform diagrams which are useful in explaining the operation of the apparatus of FIG. 8.
Figure 10B:
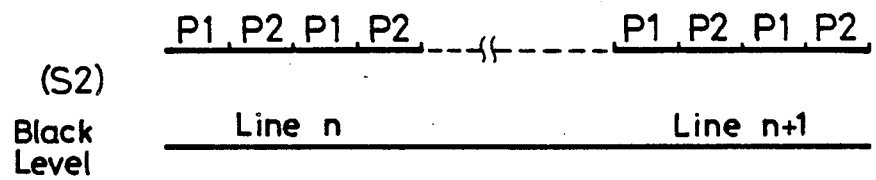
Figure 10C:
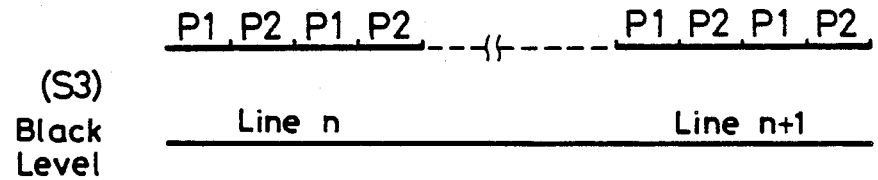

The operation of the circuit arrangement shown in FIG. 9 now will be explained with reference to the schematic waveform diagrams of FIGS. 10 and 11. First, let it be assumed that the FIG. 8 apparatus is used to image an achromatic color scene. CCD imager 1 generates the achromatic color video signal (imager signal) S1 having the two levels produced by the first and second pixels P1 and P2 of the n-th line and the two different levels produced by first and second pixels P1 and P2 of the (n+1)-th line, as shown in FIG. 10A. When the signal S1 is multiplied by respective ones of the coefficients K1 to K4 in multiplier 3 of level balance circuit 2, the multiplier generates output signal S2 in which the above-noted imager signal levels are adjusted to be substantially the same in both line n and line (n+1), as shown in FIG. 10B. In this level-corrected state, the sideband components shown in FIG. 2 are not produced.

Figure 10D:
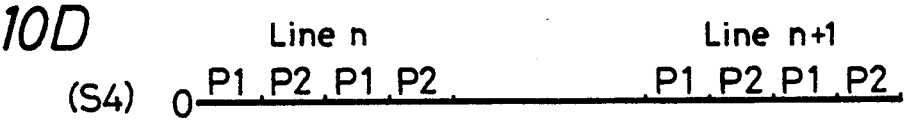

The level-corrected signal S2 is filtered by low-pass filter 5 which generates output signal S3 that is seen to be similar to signal S2. Signal S3, having low frequency components, is supplied to bandpass filter 7 which generates an output signal S4 of substantially zero level, as shown in FIG. 10D. It will be appreciated that the low frequency components of signal S3 are below the cut-off frequency of bandpass filter 7. The signal S4 is supplied as one input to adder 6.

Figure 10E:
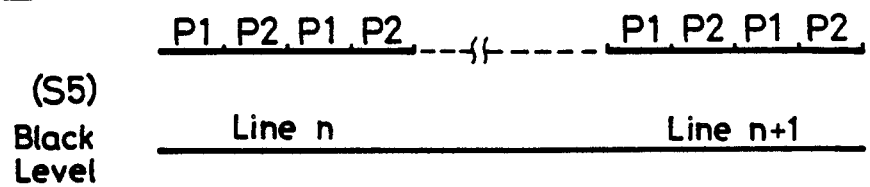

Imager signal S1 from the CCD imager also is supplied to low-pass filter 10. The spectral sensitivities of the color filters used with the CCD imager and the filter characteristics of low-pass filter 10 are such that the low-pass filter generates an output having substantially no line-to-line level differences, both for achromatic color imaging and chromatic color imaging. Therefore, low-pass filter 10 generates an output signal S5 as shown in FIG. 10E. The signal S5 is supplied as another input to adder 6 which produces an output luminance signal for achromatic color whose sideband components are removed.

Figure 11A:
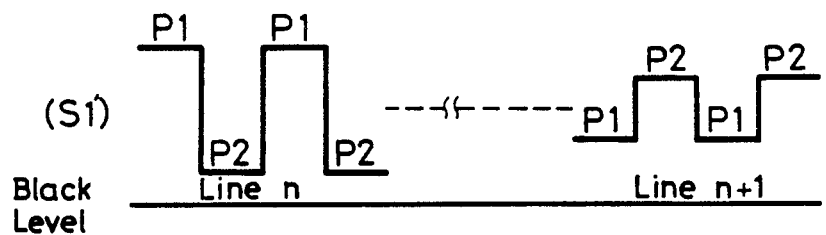
FIGS. 11A to 11E are schematic waveform diagrams which are useful in explaining the operation of the apparatus of FIG. 8.
Figure 11B:
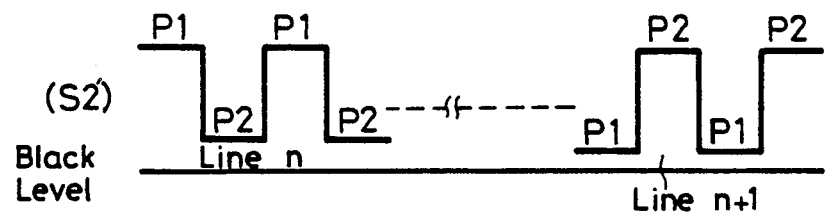

Let it now be assumed that the FIG. 8 apparatus is used to image a chromatic color scene. CCD imager 1 now generates the chromatic color video signal (imager signal) S1' having the two levels produced by the first and second pixels P1, P2 of the n-th line and the two different levels produced by the first and second pixels P1, P2 of the (n+1)-th line, as shown in FIG. 11A. The signal S1' is multiplied by respective ones of the coefficients K1 to K4 (which are the same coefficients as used when an achromatic color signal is produced in multiplier 3 of level balance circuit 2). The multiplier generates output signal S2' in which the P1 and P2 levels in line n differ from each other and from the P1 and P2 levels in line (n+1), as shown in FIG. 11B.

Figure 11C:
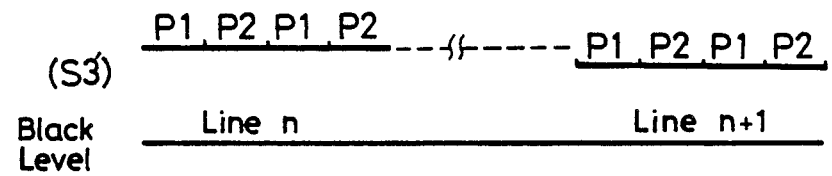
Figure 11D:
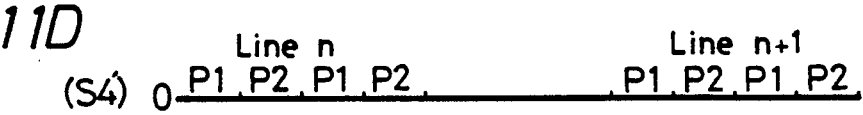
Figure 11E:
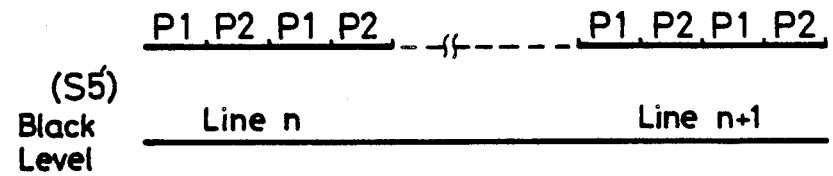

As was the case in the FIG. 4 embodiment, low-pass filter 5 filters signal S2' to produce output signal S3' in which the pixel-to-pixel levels are averaged to a common level within a line but the averaged pixel levels in one line differ from the averaged pixel levels in the next line, as shown in FIG. 11C The frequency components of low-pass filtered signal S3' are too low to pass through bandpass filter 7 and, hence, the line-to-line level differences are removed by the bandpass filter. More particularly, the signal S3' has a frequency of about half the horizontal synchronizing signal, which is below the bandpass filter cut-off frequency. Thus, bandpass filter 7 produces an output signal S4' of substantially zero level, as shown in FIG. 11D, and this signal S4' is supplied to one input of adder 6.

Output signal S11' from CCD imager 1 also is supplied to low-pass filter 10. Since the bandwidth of low-pass filter 10 prevents the pixel-to-pixel level differences within a line and from one line to the next from being passed, both for achromatic color and for chromatic color signals, as described above, the low-pass filter generates the output signal S5' shown in FIG. 11E. This filtered signal S5' is supplied to the other input of adder 6 wherein it is summed with signal S4, to produce a luminance signal in which line-to-line level differences that would otherwise be produced for chromatic color are removed.

In accordance with the present invention, the imager, or main line, signal is not processed and the aperture signal is level-balanced, resulting in a luminance signal in which line-to-line level differences are removed when the imager signal is a chromatic color signal and in which undesired noise sideband components are removed when the imager signal is an achromatic color signal.

The imager signal is derived from a complementary color filter and filtered by a low-pass filter to provide a luminance signal to which is added an outline component produced by multiplying the imager signal with predetermined pixel-by-pixel level-correcting coefficients and filtering the multiplied signal with a bandpass filter which suppresses low frequency components. The outline component extracted by the bandpass filter and added to the luminance signal results in a luminance signal whose outline is emphasized.

Having described a preferred embodiment of the present invention, it is to be understood that this invention is not limited solely to that embodiment and various changes and modifications may be made by one skilled in the art without departing from the spirit and scope of the invention.

It is intended that the appended claims be interpreted to include the embodiment disclosed herein and all equivalents

What is claimed is:

1. Apparatus for processing a color video signal comprising:
   imager means for generating a color video signal representing an image picked up by said imager means;
   low-pass filter means supplied with said color video signal from said imager means for generating a luminance signal therefrom;
   level correcting means supplied with said color video signal for producing a level-corrected luminance signal therefrom;
   bandpass filter means for extracting an outline component from the level-corrected luminance signal; and
   adding means for adding said outline component from said bandpass filter means to said luminance signal generated by said low-pass filter means.

2. The apparatus of claim 1, wherein said imager means includes a color filter.

3. The apparatus of claim 2, wherein said color filter is a complementary color filter.

4. The apparatus of claim 3 whereins aid complementary color filter comprsies a checkerboard array of color filter elements.

5. The apparatus of claim 4 wherein said checkerboard arrya of color filter elements comprises alternating first and second lines of filter elements, said first line including alternating first and second pixel units and said second line including alternating third and fourth pixel units.

6. The apparatus of claim 5 wherein said first pixel unit is comprised of cyan and magenta elements, said second pixel unit is comprised of yellow and green elements, said third pixel unit is comprised of cyan and green elements, and said fourth pixel unit is comprised of yellow and magenta elements.

7. The apparatus of claim 1, wherein said level correcting means includes a level balance circuit coupled to said imager means and a low-pass filter coupled to said level balance circuit.

8. The apparatus of claim 7, wherein said level balance circuit is comprised of a multiplier for receiving said color video signal and a switch for supplying multiplying coefficients to said multiplier.

9. The apparatus of claim 8 wherein said imager means includes rows of color filter elements, each row containing a repetitive pattenr of filter pixels; said apparatus further comprisign a timing circuit for generating timing signals to establish filter pixel and row scanning times, and a control circuit supplied with said timing signals for controlling said switch to supply a respective multiplying coefficient to said multiplier as a function fo the row and filter pixel scanning times.

10. The apparatus of claim 1, wherein said imager means is a charge coupled device (CCD).

* * * * *